United States Patent [19]
Morisaki

[11] 3,928,918
[45] Dec. 30, 1975

[54] DEVICE FOR MEASURING THE THICKNESSES OF PARTS HAVING AN ARCUATE PORTION SUCH AS BEARINGS AND THE LIKE

[75] Inventor: Nobukazu Morisaki, Aichi, Japan

[73] Assignee: Daido Metal Company, Ltd., Nagoya, Japan

[22] Filed: July 8, 1974

[21] Appl. No.: 486,430

[52] U.S. Cl. ............. 33/172 R; 33/147 E; 33/169 R
[51] Int. Cl.² .......................................... G01B 5/02
[58] Field of Search .......... 33/169 R, 147 R, 147 E, 33/147 M, 174 P, 174 Q, 172 R, 184.5, 174 F, 169 C, 203.16, 203.19, 174 R

[56] References Cited
UNITED STATES PATENTS

| | | |
|---|---|---|
| 1,969,669 | 8/1934 | Marcy ............................. 33/184.5 |
| 3,176,402 | 4/1965 | Cocks .............................. 33/147 E |
| 3,831,282 | 8/1974 | Falk ................................ 33/174 F |

Primary Examiner—Richard E. Aegerter
Attorney, Agent, or Firm—Karl W. Flocks

[57] ABSTRACT

A device for measuring the thicknesses of parts having an arcuate portion such as bearings and the like in which said arcuate portion of said parts is placed and put between a stopping member having a convexly curved surface adapted to be in contact with the inner surface of said arcuate portion and a pressing member adapted to be in contact with the outer surface of said arcuate portion at two points, and a detecting rod of a measuring instrument is adapted to detect the thickness of said arcuate portion while said stopping member is in contact with the inner surface of said arcuate portion at a point on the axis of said detecting rod of said measuring instrument.

10 Claims, 11 Drawing Figures

DEVICE FOR MEASURING THE THICKNESSES OF PARTS HAVING AN ARCUATE PORTION SUCH AS BEARINGS AND THE LIKE

The present invention relates to a device for measuring the thicknesses of parts having an arcuate portion such as tubular bearings used in sliding contact applications, sprit bearings produced by dividing intgo halves said tubular bearings, and the like.

In general, tubular bearings and sprit bearings produced by dividing tubular bearings into halves are mounted in bearing cases while being applied loads caused by their interferences. And these bearing cases are expanded slightly by the stresses due to elasticities of the bearings. With the remarkable progress of internal combustion engines, a high degree of accuracy has been demanded for the inner diameters of these bearings mounted in the bearing cases in such a manner of mounting. Although the thicknesses of these bearings are very important because the degree of accuracy of said inner diameters is dependent upon said thicknesses, to date there has been no measuring device which is capable of measuring such thicknesses accurately and speedily and used exclusively for this purpose.

The present invention relates to a measuring device which solves the problem described above.

An object of the present invention is to provide a measuring device capable of measuring accurately and speedily the thicknesses of parts having an arcuate portion such as bearings.

Another object of the present invention is to provide a measuring device including means which solves peculiar problems arising when measuring the thicknesses of parts having an arcuate portion such as bearings and the like and is adapted to position said bearings and the like accurately when the thicknesses of said bearings and the like are measured.

Still another object of the present invention is to provide a measuring device including means for mixing said bearings and the like so that a detecting rod of a measuring instrument can measure accurately the thicknesses of said bearings and the like.

A further object of the present invention is to ptovide a measuring device including means for controlling the pressure when the means for positioning beaarings and the like fixed said bearings and the like.

These objects and features of the present invention will become more clear by the following description of a preferred embodiment taking reference with the attached drawings, in which.

Hereunder a detailed explanation will be given on an embodiment of the measuring device in accordance with the present invention with reference to the attached drawings.

Figure 3:
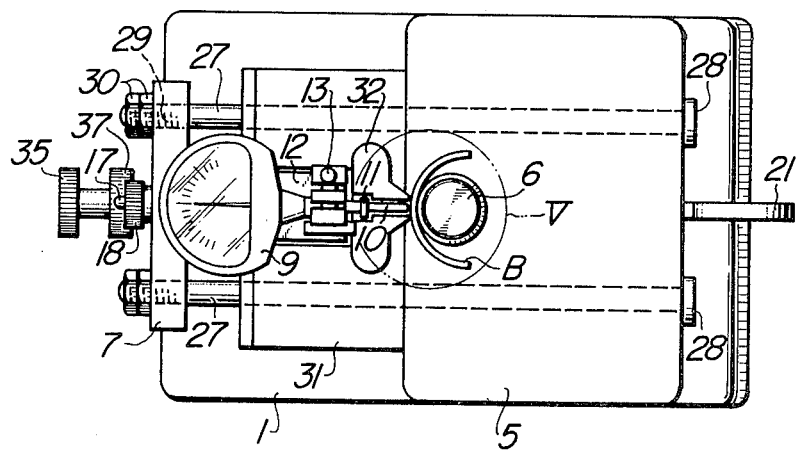
FIG. 3 is a plan view illustrating an embodiment of the present invention with a surface plate being placed horizontally.
Figure 4:
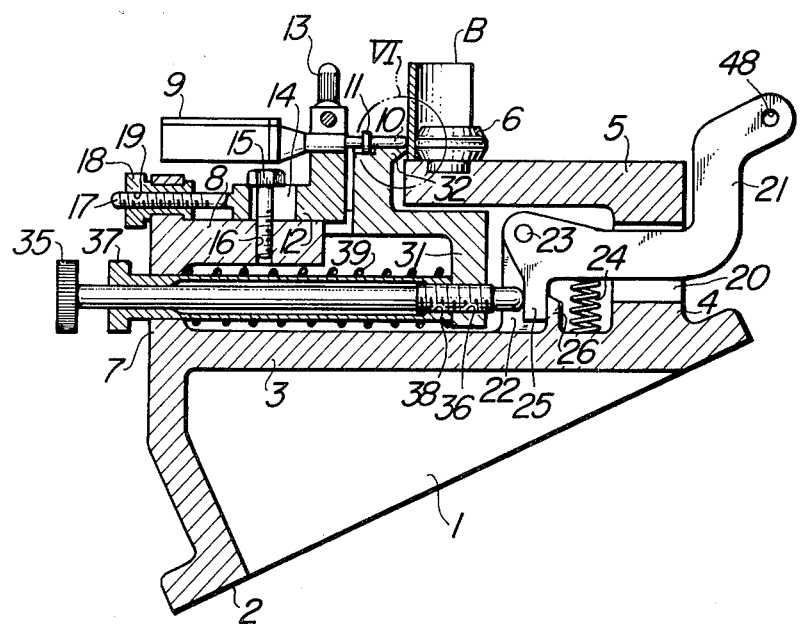
FIG. 4 is a longitudinal sectional view of the embodiment of FIG. 3.
Figure 5:
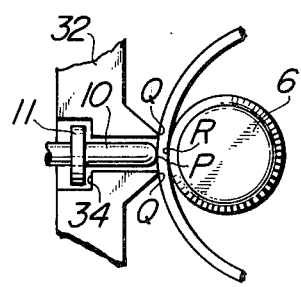
FIG. 5 is a partly enlarged plan view of FIG. 3.
Figure 6:
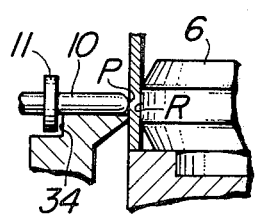
FIG. 6 is a partly enlarged side view of FIG. 4.

Referring to FIGS. 3 and 4, the numeral 1 indicates a base provided on a suitable work table (not shown). The base 1 has a base plate 3 inclining downwardly toward the front part of the device (toward the right as viewed in FIG. 4) at an angle of about 25 degrees with respect to the fitting surface 2 of the base 1. In the front part of the base 1 there is disposed a surface plate 5 which is parallel to said base plate 3, with a front wall 4 being interposed between the surface plate 5 and the base plate 3. The surface plate 5 may be either constructed integrally with the base 1 or manufactured separately to be thereafter fixed securely to the base 1. When the base 1 is mounted on the work table, the surface plate 5 inclines downwardly toward the front part of the device. With this arrangement, the operator facing the surface plate 5 can perform a measuring operation with a great ease.

Referring to FIG. 4, it will be noted that the base 1 makes a certain angle with the base plate 3. Therefore, it will be readily seen that the surface plate 5 inclines forwardly and downwardly if the base 1 is placed on the horizontal upper surface of a table. If the measuring device in FIG. 4 is rotated approximately 90° clockwise about the lateral axis thereof, a state is established in which the measuring device is placed on the horizontal upper surface of a table (not shown). It is obvious that, when the measuring device in this state is looked at by the operator in the direction from the right to the left as viewed in FIG. 4, the surface plate 5 inclines forwardly and downwardly and stands up toward the operator, so that the operator can see and manipulate the surface plate 5 very easily.

Numeral 6 designates a stopping member provided on said surface plate 5 in a positional relationship in which the stopping member 6 is perpendicular to the upper surface of the surface plate 5. Referring to FIG. 4, the stopping member 6 is mounted on the surface plate 5 such that the curved surface of the stopping member 6 is perpendicular to the upper surface of the surface plate 5. A bearing B the thickness of which is to be measured is placed on the surface plate 5 in such a manner that the inner surface of the bearing B is in contact with said curved surface of the stopping member 6 and is at right angles to the upper surface of the surface plate 5. Although the stopping member 6 shown in the figures has a circular shape, the stopping member 6 may alternatively have any other shape desired provided that at least one portion thereof forms a convexly curved surface with which the inner surface of the bearing and the like B placed on the surface plate 5 comes into contact.

Figure 11:
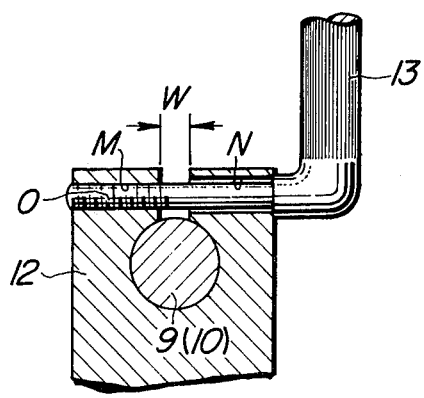
FIG. 11 is a partly enlarged explanatory view illustrating a support and a fixing arm which are included in the embodiment of FIGS. 3 and 4 and used for attaching and removing a measuring instrument to and from the device in accordance with the present invention.

In the rear part of the base 1 there is arranged a fitting portion 8 which is adjacent to a rear wall 7 and parallel to the surface plate 5. The numeral 9 indicates a measuring instrument consisting of, for instance, a dial indicator with graduations in 0.001 mm. and a full scale of 0.1 mm. The measuring instrument 9 is provided with a fine adjustment knob (not shown) for adjusting the movement of pointer and a detecting rod or measuring spindle 10 which has a stepped portion 11 and can move forwardly and rearwardly. The numeral 12 designates a support to which the measuring instrument 9 is attached. The measuring instrument 9 thus attached to the support 12 is fixed in place by a fixing arm 13. The support 12 is adapted to be adjustably fixed to the fitting portion 8 by engaging the thread on a bolt 15 extending through an elongated hole 14 in the support 12 with an internal thread 16 provided in the fitting portion 8. The tip of the detecting rod 10 of the measuring instrument 9 is adapted to project toward the stopping member 6. A screw 17 protrudes from the rear part of the support 12 and engages with an internal thread 19 of an adjusting knob 18 in engagement with the rear wall 7. Therefore, if the bolt 15 is lossened and the adjusting knob 18 is rotated, the support 12 moves toward and away from the stopping member 6. FIG. 11 is a partly enlarged sectional explanatory view showing the measuring instrument 9, the support 12, and the fixing arm 13 illustrated in FIGS. 3 and 4. The supportt 12 has an internal thread M and a clearance hole N, and the fixing arm 13 is provided with an external thread O.

The measuring instrument 9 can be attached to or removed from the device in accordance with the present invention by rotating the fixing arm 13 to decrease or increase a space W.

The front wall 4 has a hole 20. An operating lever 21 extends through the hole 20 and is inserted into the device at a position beneath the surface plate 5. The operating lever 21 is pivoted on a pin 23 on a yoke 22 formed on the upper surface of the base plate 3. An expansion spring 24 disposed between the operating lever 21 and the base plate 3 presses the front end of the operating lever 21 upwardly at all times, so that a projection 25 of the operating lever 21 engages a stop 26 protruding from the base plate 3.

A pressing portion 32 is formed with a guiding groove 33 for guiding the detecting rod 10 of the measuring instrument 9 (refer to FIG. 3) and an engaging portion 34 which is so engaged by the stepped portion 11 that a top P of the detecting rod 10 projects a small distance from two tips Q of the pressing portion 32 and is maintained in this state.

Figure 8:
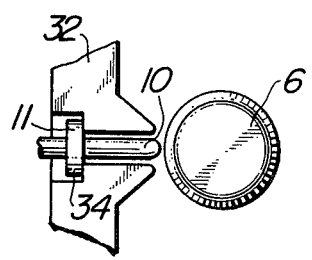
FIG. 8 is a partly enlarged plan view of FIG. 3 with a bearing B removed.
Figure 9:
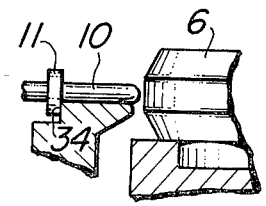
FIG. 9 is a partly enlarged plan view of FIG. 4 with a bearing B removed.

FIGS. 8 and 9 show a portion of the device in accordance with the present invention from which the bearing B has been removed. In other words, the figures illustrate a state in which no measuring operation is being perfomed.

In this state, the stepped portion 11 and the engaging portion 34 are in contact with each other in an engaging manner. Turning to FIGS. 3 through 6 showing a state in which a measuring operation is being carried out, it is noted that, in contrast to the state illustrated in FIGS. 8 and 9, the tip P of the detecting rod 10 has moved rearwardly to a position substantially flush with the tips Q of the pressing portion 32 or to a position slightly inwardly (to the left as viewed in the figures) of said tips Q and inside the guiding groove 33. In this state, the stepped portion 11 and the engaging portion 34 are spaced apart from each other a distance equal to the distance said tip P has moved rearwardly. The detecting rod 10 is adapted to move rearwardly together with the pressing portion 32 when its tips Q are pressed rearwardly.

Figure 10:
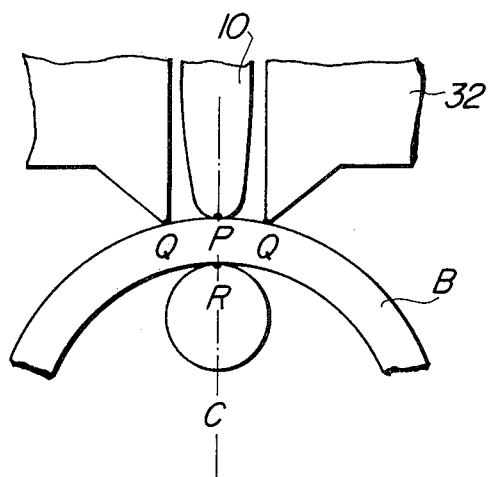
FIG. 10 is a partly enlarged explanatory plan view of FIG. 3.

FIG. 10 is a partly enlarged explanatory plan view of FIG. 3 and shows an important feature of the construction employed in the present invention.

The bearing B is supported at three points (Q, Q, and R) and firmly fixed on the surface plate 5 at right angles to the surface plate 5 in a very stable manner, so that the true thickness can be measured. A contacting point R of the stopping member 6 having a circular shape and a contacting point P of the detecting rod 10 both are on a center line C extending on the center of the stopping member 6 and the axis of the detecting rod 10, and contacting points Q are located at positions which are symmetrical as viewed from the center line C. The numeral 35 designates an adjusting screw in engagement with an internal thread 36 provided in a movable member 31. The adjusting screw 35 is arranged parallel to the surface plate 5 and the front end of the adjusting screw 35 projects from the movable member 31. The numeral 37 indicates a cylinder provided with an internal thread 38 which is in engagement with a thread on the adjusting screw 35 so that a looseness is never produced between the adjusting screw 35 and the internal thread 36. The cylinder 37 is fitted on the outer periphery of the adjusting screw 35 and extends slidably through the rear wall 7. The numeral 39 designates a pressing spring wound on the cylinder 37 to give a forwardly directed spring force to the movable member 31.

A pair of parallel rods 27 are arranged on the base 1 to extend parallel to the surface plate 5 from the front wall 4 to the rear wall 7. Each rod 27 has a head 28 at one end thereof and a threaded portion 29 at the other end thereof. The head 28 is securely fixed to the device and the threaded portion 29 is also fixed to the device by means of two nuts 30 in engagement with the threaded portion 29. The movable member 31 is mounted on the rods 27 through plain bearings (not shown) to be moved forwardly and rearwardly on and along the rods 27. On the movable member 31 there is formed integrally with said movable member 31 the pressing portion 32 having the tips Q with the bearing B being interposed between the pressing portion 32 and the stopping member 6. Thanks to the action of the pressing spring 39 the end of the adjusting screw 35 is in contact with the projection 25 which is pressed onto the stop 26, so that the forwardly moved position of the movable member 31 can be adjusted. It is necessary to adjust the forwardly moved position of the movable member 31 according to the thickness range of a particular group of bearings which are going to undergo a measuring operation. This adjustment can be done by rotating the cylinder 37 in a given direction until loose, rotating the adjusting screw 35 in a suitable manner, and rotating the cylinder 37 in a direction opposite to said given direction so that the cylinder 37 is tightened and fixed.

Figure 7:
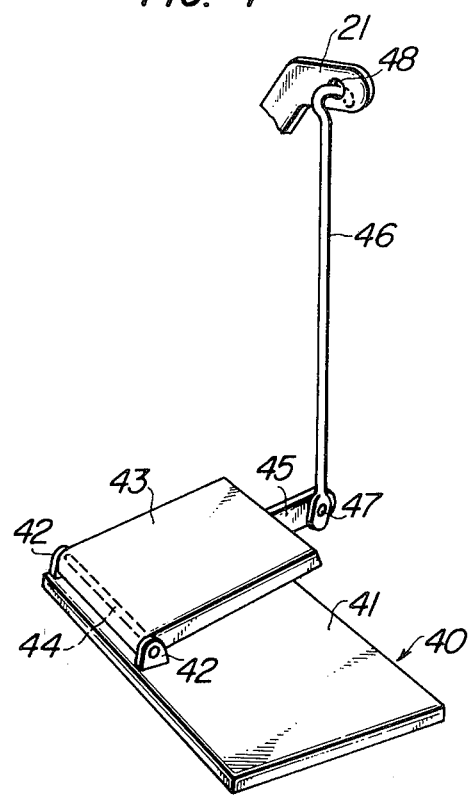
FIG. 7 is a perspective view showing pedal plate means for operating the device in accordance with the present invention.

Turning to FIG. 7, pedal plate means 40 has a fitting plate 41 placed on the floor. A pin 44 extending through a pedal plate 43 is pivotably inserted into a pair of connections 42 projecting from the fitting plate 41. The lower end of a connecting rod 46 is pivotably supported on a pin 47 disposed on a connecting portion 45 protruding from said pedal plate 43. The upper end of said connecting rod 46 engages a hole 48 provided in the operating lever 21.

Hereunder an explanation will be made on the operation of the device in accordance with the present invention which has a construction described above. When measuring the thickness of the bearing B. the pedal plate 43 is depressed with a foot, so that the connecting rod 46 is moved downwardly and the operating lever 21 is swung. With this operation, the projection 25 pushes the front end of the adjusting screw 35 to move the movable member 31 rearwardly, with the result that the tips Q of the pressing portion 32 and the tip P of the detecting rod 10 are moved away from the stopping member 6 making a space therebetween larger. In this state, the bearing B is placed on the surface plate 5 with the inner surface of the bearing B being in contact with the rear surface of the stopping member 6 or being in close vicinity to said rear surface. Then, the foot is removed from the pedal plate 43 to move the movable member 31 forwardly. As a result of this operation, the detecting rod 10 comes in contact with the bearing B and substantially stops moving. The tips Q of the pressing portion 32 press the bearing B with the bearing B being put between the tips Q of said pressing portion 32 and the stopping member 6. This operation takes place instantaneously. At this point, the indicated value on the measuring instrument 9 is read. Thereafter, the pedal plate 43 is depressed again for removing the bearing B and performing next measurement. An accurate value of bearing thickness can be obtained if reference thicknesses are measured beforehand in the manner as described above using block gauges and such reference thicknesses are compared with the bearing thicknesses indicated by the measuring instrument 9.

As described above, in accordance with the present invention, the movable member 31 is moved against the effect of the pressing spring 39, so that a space between the tips Q of the pressing portion 32 and the stopping member 6 and between the tip P of the detecting rod 10 and the stopping member 6 is increased. Then, a bearing is placed on the surface plate 5 so that the bearing is positioned in said space. The movable member 31 is moved toward the original position thereof thanks to the effect of the pressing spring 39, and the value indicated on the measuring instrument 9 is read upon completion of said movement of the movable member 31. Thus, the thickness of the bearing can be measured in a very simple and speedy manner. In addition, the present invention enjoys an advantage that an accurate measurement can be performed using block gauges instead of special gauges.

As has been described in the foregoing, the device in accordance with the present invention has a construction to meet and unlock peculiar problems arising when measuring the thicknesses of parts having an arcuate portion such as bearings. In this construction, the stopping member with a curved surface adapted to be in contact with the inner surface of the arcuate portion of a bearing and the like is so arranged that the point at which said stopping member comes into contact with said arcuate inner surface is adapted to be positioned on the axis of the detecting rod of the measuring instrument, and the pressing portion is adapted to come into contact with the outer surface of said bearing and the like at two points which are symmetrical as viewed from the axis of said detecting rod of said measuring instrument. It should further be noted that thanks to the spring adapted to impart a spring force to the movable member the pressure of the pressing portion is adapted to be controlled when the pressing portion is brought into contact with the bearing and the like. In the present invention, the positioning, i.e., the control of posture, of the bearing and the like to undergo a measuring operation is done by the use of the previously described three points (Q, Q, and R) of the pressing portion and the stopping member, and by placing said bearing and the like on the surface plate 5 in a positional relationship in which said bearing and the like is at right angles to the surface plate 5.

Figure 1:
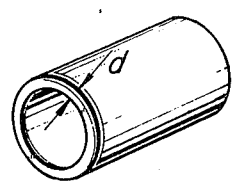
FIGS. 1 and 2 are perspective views showing two different bearings the thicknesses $d$ of which are to be measured by the device in accordance with the present invention.
Figure 2:
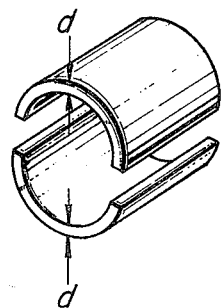

In accordance with the present invention, the measurement of thickness can be performed on parts having an arcuate portion other than bearings as well as the tubular bearing shown in FIG. 1 and the split bearing of FIG. 2 which is produced by dividing a tubular bearing into halves.

In the present invention, the pedal plate means 40 is employed so that the operator can use his free hands for handling a bearing to be measured. Alternatively, the operating lever 21 may be constructed such that it can be manipulated with a hand directly.

What we claim is:

1. A device for measuring the thicknesses of parts having an arcuate portion such as bearings: comprising:
   a surface plate provided on a base,
   a stopping member disposed on said surface plate, said stopping member having a convexly curved surface substantially perpendicular to said surface plate, said convexly curved surface being adapted to be in contact with the inner surface of said arcuate portion of said parts,
   a movable member adapted to be moved relative to said base in the direction parallel to said surface plate, said movable member having a pressing portion adapted to come into contact with the outer surface of said arcuate portion of said parts at two points,
   a spring means adapted to impart a spring force to said movable member so that the pressing portion of said movable member presses said arcuate portion of parts to put said arcuate portion between said pressing portion and said stopping member, and
   a measuring instrument mounted on said base in adjustably secured relation to said base, said measuring instrument having a detecting rod, the axis of said detecting rod being arranged to be of symmetry for said two points at which said pressing portion comes into contact with the outer surface of said arcuate portion, said detecting rod being adapted to be moved together with said pressing portion away from said stopping member, said arcuate portion being adapted to be placed, substantially perpendicular to said surface plate, between said stopping member, and said pressing portion and said detecting rod when said pressing portion and said detecting rod are spaced apart from said stopping member, said arcuate portion being put between said two points of said pressing portion and said stopping member when said movable member is moved toward the original position thereof by the action of said spring means, the point at which said stopping member is in contact with the inner surface of said arcuate portion of said parts being on the axis of said detecting rod, and said detecting rod coming into contact with said arcuate portion of said parts.

2. A measuring device in accordance with claim 1, wherein said detecting rod is provided with a stepped portion, and said pressing portion is provided with engaging means, said engaging means being adapted to be engaged with said stepped portion to move said detecting rod away from said stopping member when said pressing portion is moved against the spring force of said spring means away from said stopping member.

3. A measuring device in accordance with claim 1, wherein said spring means includes means adapted to control the pressing force with which said arcuate portion is put between said pressing portion and said stopping member.

4. A measuring device in accordance with claim 1, wherein said measuring instrument is adapted to be fixed to said base so that the position of said measuring instrument is adjustable with respect to said base.

5. A measuring device in accordance with claim 1 in which said base includes means for inclining said surface plate forwardly and downwardly so that the operator facing said surface plate can perform with ease the operation to measure the thickness of said bearing and the like.

6. A measuring device in accordance with claim 1 in which said measuring device includes lever means pivoted on said base and adapted when rotated to move said movable member away from said stopping member by means of one end thereof against the spring force of said spring means.

7. A measuring device in accordance with claim 6, wherein said device further includes a pedal plate means adapted to be swung by being depressed with the operator's foot, a connecting rod means adapted to connect the other end of said lever means to said pedal plate means for swinging said the other end of said lever means when said pedal plate means is swung by being depressed with the operator's foot thereby to move said movable member away from said stopping member.

8. A measuring device in accordance with claim 6, wherein said lever means is biassed in the unidirection by a spring force to prevent said movable member from being moved away from said stopping member as long as said lever means is not swung.

9. A measuring device in accordance with claim 1, wherein said stopping member is constructed in the form of cylinder.

10. A measuring device in accordance with claim 1, whierein said measuring instrument is a dial indicator.

* * * * *